United States Patent
Dai et al.

(10) Patent No.: US 12,458,325 B2
(45) Date of Patent: Nov. 4, 2025

(54) ULTRASONIC IMAGING METHOD AND ULTRASONIC IMAGING SYSTEM

(71) Applicant: GE Precision Healthcare LLC, Wauwatosa, WI (US)

(72) Inventors: Renjie Dai, Wuxi (CN); Hangjun Li, Wuxi (CN); Kai Ji, Wuxi (CN); Chengcheng Zhou, Wuxi (CN); Fenggui Huang, Wuxi (CN)

(73) Assignee: GE Precision Healthcare LLC, Wauwatosa, WI (US)

( * ) Notice: Subject to any disclaimer, the term of this patent is extended or adjusted under 35 U.S.C. 154(b) by 225 days.

(21) Appl. No.: 18/326,695

(22) Filed: May 31, 2023

(65) Prior Publication Data

US 2023/0380808 A1    Nov. 30, 2023

(30) Foreign Application Priority Data

May 31, 2022 (CN) .......................... 202210639282.4

(51) Int. Cl.
*A61B 8/00* (2006.01)
*G06F 3/01* (2006.01)
*G06F 3/04847* (2022.01)
*G06F 3/04883* (2022.01)

(52) U.S. Cl.
CPC .............. *A61B 8/467* (2013.01); *G06F 3/016* (2013.01); *G06F 3/04847* (2013.01); *G06F 3/04883* (2013.01)

(58) Field of Classification Search
CPC .... G06F 3/16; G06F 3/04847; G06F 3/04883; A61B 8/467
See application file for complete search history.

(56) References Cited

U.S. PATENT DOCUMENTS

2020/0200899 A1*  6/2020  Aase ................... G01S 7/52053

FOREIGN PATENT DOCUMENTS

CN         104915002 B       5/2019

\* cited by examiner

*Primary Examiner* — Gerald Johnson

(57) ABSTRACT

Provided in the present application are an ultrasonic imaging system, a non-transitory computer-readable medium, and an ultrasonic imaging method. The method includes generating an ultrasound image and displaying it on a display device. The method includes receiving a gesture instruction from a user, the gesture instruction being generated by a sliding operation on a touch screen. The method includes performing identification of the gesture instruction; and, in response to the gesture instruction being identified, generating a feedback signal so as to provide identification feedback to the user, and controlling an ultrasonic imaging system to enter an operating mode corresponding to the gesture instruction.

13 Claims, 5 Drawing Sheets

ULTRASONIC IMAGING METHOD AND ULTRASONIC IMAGING SYSTEM

CROSS-REFERENCE TO RELATED APPLICATION

This application claims priority to Chinese patent application number 202210639282.4, filed on May 31, 2022, the entirety of which is incorporated herein by reference.

TECHNICAL FIELD

The present application relates to the field of medical imaging and relates in particular to an ultrasonic imaging method and an ultrasonic imaging system.

BACKGROUND

Ultrasonic imaging is a real-time imaging means. An ultrasonic probe sends an ultrasonic signal to a part to be scanned of a subject, and receives an echo signal. An ultrasonic imaging system performs real-time imaging, on the basis of the echo signal, on the part to be scanned, and displays the same on a display device. During imaging, a user needs to observe a real-time image, and then adjust the real-time image to thereby acquire a satisfactory image.

Adjustment of a real-time image is typically performed by using a user interface. For example, switching between imaging modes or adjustment to an imaging parameter is performed by means of a user interface. During the search for a required user interface, the user moves their gaze from an ultrasound image on the display device to the user interface. Then, the ultrasound image on the display device is observed again while operating the user interface. Conventional processes increase the workflow of a user. Additionally, switching of the line of sight from a user input apparatus to a display device also negatively affects the efficiency of adjusting an ultrasound image.

SUMMARY

The aforementioned defects, deficiencies, and problems are solved herein, and these problems and solutions will be understood through reading and understanding the following description.

Provided in some embodiments of the present application is an ultrasonic imaging method, comprising: generating an ultrasound image and displaying the same on a display device; receiving a gesture instruction from a user, the gesture instruction being generated by a sliding operation on a touch screen; performing identification of the gesture instruction; and in response to the gesture instruction being identified, generating a feedback signal so as to provide identification feedback to the user, and controlling an ultrasonic imaging system to enter an operating mode corresponding to the gesture instruction.

Further provided in some embodiments of the present application is an ultrasonic imaging system, comprising: a probe, configured to acquire a signal for generating an ultrasound image; a touch screen, configured for operation to generate an instruction; a processor, configured to: generate an ultrasound image and display the same on a display device; receive a gesture instruction from a user, the gesture instruction being generated by a sliding operation on a touch screen; perform identification of the gesture instruction; and in response to the gesture instruction being identified, generate a feedback signal so as to provide identification feedback to the user, and control an ultrasonic imaging system to enter an operating mode corresponding to the gesture instruction; and a display device, configured to receive a signal from the processor and perform a display operation.

Further provided in some other embodiments of the present application is a non-transitory computer-readable medium, having a computer program stored therein, the computer program having at least one code segment, and the at least one code segment being executable by a machine so as to enable the machine to: generate an ultrasound image and display the same on a display device; receive a gesture instruction from a user, the gesture instruction being generated by a sliding operation on a touch screen; perform identification of the gesture instruction; and in response to the gesture instruction being identified, generate a feedback signal so as to provide identification feedback to the user, and control an ultrasonic imaging system to enter an operating mode corresponding to the gesture instruction.

It should be understood that the brief description above is provided to introduce, in a simplified form, concepts that will be further described in the detailed description. However, the brief description above is not meant to identify key or essential features of the claimed subject matter. The scope is defined uniquely by the claims that follow the detailed description. Furthermore, the claimed subject matter is not limited to implementations that solve any deficiencies raised above or in any section of the present disclosure.

BRIEF DESCRIPTION OF THE DRAWINGS

The present application will be better understood by reading the following description of non-limiting embodiments with reference to the accompanying drawings, wherein.

DETAILED DESCRIPTION

Specific embodiments of the present application are described below. It should be noted that in the specific description of these embodiments, for a concise description, the present application may not describe in detail all of the features of the actual embodiments. It should be understood that in the actual implementation process of any embodiments, just as in the process of any one engineering project or design project, a variety of specific decisions are often made to achieve specific goals of the developer and to meet system-related or business-related constraints, which may also vary from one embodiment to another. Furthermore, it should also be understood that although efforts made in such development processes may be complex and extended, for a person of ordinary skill in the art related to the disclosure of the present application, some design, manufacture or production changes made on the basis of the technical disclosure of the present disclosure are only conventional technical means, and should not be construed that the content of the present disclosure is insufficient.

Unless otherwise defined, the technical or scientific terms used in the claims and the description should be as they are usually understood by those possessing ordinary skill in the technical field to which the present invention pertains. The terms "first", "second" and similar words used in the present application and the claims do not express any order, quantity or importance, but are merely intended to distinguish between different constituents. The terms "one" or "a/an" and similar terms do not express a limitation of quantity, but rather that at least one is present. The terms "include" or "comprise" and similar words indicate that an element or article preceding the terms "include" or "comprise" encompasses elements or articles and equivalent elements thereof listed after the terms "include" or "comprise," and does not exclude other elements or articles. The terms "connect" or "link" and similar words are not limited to physical or mechanical connections, and are not limited to direct or indirect connections.

Figure 1:
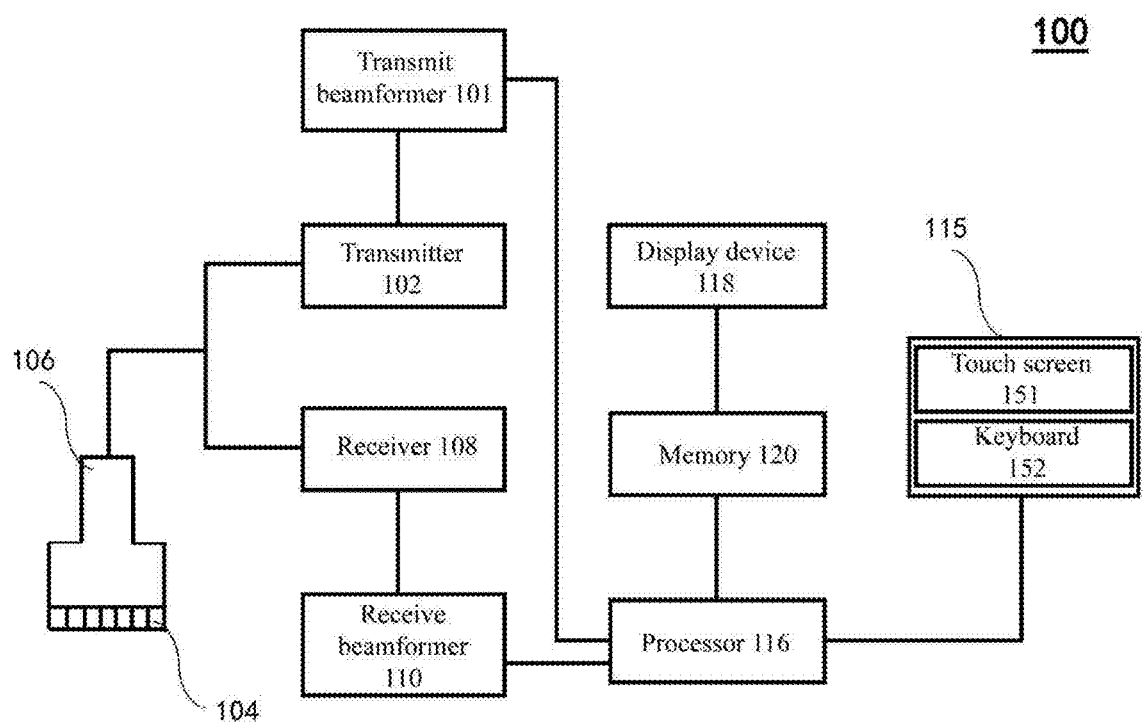
FIG. 1 is a schematic diagram of an ultrasonic imaging system according to some embodiments of the present application.

FIG. 1 is a schematic diagram of an ultrasonic imaging system 100 according to some embodiments of the present application. The ultrasonic imaging system 100 includes a transmit beamformer 101 and a transmitter 102, which drive elements 104 within a probe 106 to transmit pulsed ultrasound signals into the body (not shown). According to various embodiments, the probe 106 may be any type of probe including a linear probe, a curved array probe, a 1.25D array probe, a 1.5D array probe, a 1.75D array probe, or a 2D array probe. According to other embodiments, the probe 106 may also be a mechanical probe, for example, a mechanical 4D probe or a hybrid probe. The probe 106 may be configured to acquire 4D ultrasound data, and the 4D ultrasound data includes information related to how volume changes over time. Each volume may include a plurality of 2D images or slices. Still referring to FIG. 1, the pulsed ultrasound signals are backscattered from structures in the body (for example, blood cells or muscle tissue) to produce echoes that return to the elements 104. The echoes are converted by the elements 104 into electrical signals or ultrasound data, and the electrical signals are received by a receiver 108. The electrical signals representing the received echoes pass through a receive beamformer 110 that outputs ultrasound data. According to some embodiments, the probe 106 may include an electronic circuit so as to perform all or part of transmit beamforming and/or receive beamforming. For example, all or part of the transmit beamformer 101, the transmitter 102, the receiver 108, and the receive beamformer 110 may be located in the probe 106. The terms "scan" or "scanning" may also be used in the present disclosure to refer to acquiring data through the process of transmitting and receiving ultrasound signals. The terms "data" and "ultrasound data" may be used in the present disclosure to refer to one or a plurality of datasets acquired using an ultrasonic imaging system. A user interface 115 may be configured to control the operation of the ultrasonic imaging system 100. The user interface may be configured to control the input of patient data or to select various modes, operations, parameters, and so on.

The user interface 115 may include one or more input apparatuses. In an embodiment, the user interface 115 may include a touch screen 151. The touch screen 151 may generate an input signal in response to an operation of a user. For example, the user may generate an input signal by means of a finger approaching the touch screen 151. Principles of generating input signals may be arbitrary in the art. For example, the approaching of the finger of the user can cause a change in electrode capacitance of the touch screen 151 so as to generate an electrical signal. Furthermore, the touch screen 151 may include different types of virtual keys. By means of an operation performed by the user, for example, tapping a virtual key, the touch screen 151 generates an input signal corresponding thereto, and sends the same to a processor, so as to perform a corresponding operation on the ultrasonic imaging system.

In some embodiments, the touch screen 151 and a display device 118 are provided separated from each other. For example, the display device 118 is configured to be higher than the touch screen 151. An ultrasound image generated by the ultrasonic imaging system 100 is configured to be displayed on the display device 118. The higher position enables the ultrasound image on the display device 118 to be easily observed by the user. The touch screen 151 is in a lower position so as to be closer to the user for easy operation by the user. In some other embodiments, the touch screen 151 and the display device 118 may be integrated. For example, in some compact ultrasonic imaging systems, the display device 118 may have the functions of the touch screen 151. Part of the area of the display device 118 is for displaying an ultrasound image, and the rest is for configuring virtual keys and the like to facilitate the user to perform a touch operation.

Furthermore, the user interface 115 may further include a keyboard 152. The keyboard 152 may include functional keys having different functions. These functional keys can be operated to provide different user input functions. Some functional keys may be pressed to generate electrical signals to the processor. Some other functional keys may be operated by means of other manners such as rotation, pushing, and the like. In some embodiments, the keyboard 152 may include a physical keyboard. In some other embodiments, the keyboard 152 may also include a virtual keyboard, which includes, for example, virtual keys displayed on the touch screen. Furthermore, the user interface 115 may further include a trackball, a mouse, or any other user input device. The foregoing will not be described any further.

The ultrasonic imaging system 100 further includes a processor 116, which controls the transmit beamformer 101, the transmitter 102, the receiver 108, and the receive beamformer 110. According to various embodiments, the receive beamformer 110 may be a conventional hardware beamformer or software beamformer. If the receive beamformer 110 is a software beamformer, then the receive beamformer 110 may include one or a plurality of the following components: a graphics processing unit (GPU), a microprocessor, a central processing unit (CPU), a digital signal processor (DSP), or any other type of processor capable of performing logical operations. The beamformer 110 may be configured to implement conventional beamforming techniques and techniques such as retrospective transmit beamforming (RTB).

The processor 116 is in electronic communication with the probe 106. The processor 116 may control the probe 106 to acquire ultrasound data. The processor 116 controls which elements 104 are activated and controls the shape of a beam transmitted from the probe 106. The processor 116 is also in electronic communication with the display device 118, and the processor 116 may process the ultrasound data into an image for display on the display device 118. For the purpose of the present disclosure, the term "electronic communication" may be defined to include wired connection and wireless connection. According to an embodiment, the processor 116 may include a central processing unit (CPU). According to other embodiments, the processor 116 may include other electronic components capable of performing processing functions, for example, a digital signal processor (DSP), a field-programmable gate array (FPGA), a graphics processing unit (GPU), or any other type of processor. According to other embodiments, the processor 116 may include a plurality of electronic components capable of performing processing functions. For example, the processor 116 may include two or more electronic components selected from a list including the following electronic components: a central processing unit (CPU), a digital signal processor (DSP), a field-programmable gate array (FPGA), and a graphics processing unit (GPU). According to another embodiment, the processor 116 may include a complex demodulator (not shown), which demodulates RF data and generates raw data. In another embodiment, the demodulation may be performed earlier in a processing chain. The processor 116 may be adapted to perform one or a plurality of processing operations on data according to a plurality of selectable ultrasound modalities. As echo signals are received, data may be processed in real time in a scanning stage. For the purpose of the present disclosure, the term "real time" is defined to include a process that is performed without any intentional delay. A real-time frame or volume rate may vary on the basis of a part in which data thereof is acquired or the size of a volume and specific parameters used in the acquisition process. The data may be temporarily stored in a buffer (not shown) in the scanning stage, and processed in a less real-time manner in live or offline operations. Some embodiments of the present application may include a plurality of processors (not shown) so as to handle processing tasks. For example, a first processor may be configured to demodulate and decimate RF signals, while a second processor may be configured to further process data which is then displayed as an image. It should be recognized that other embodiments may use different processor arrangements. For embodiments in which the receive beamformer 110 is a software beamformer, the aforementioned processing tasks belonging to the processor 116 and the software beamformer may be performed by a single processor, for example, the receive beamformer 110 or the processor 116. Alternatively, the processing functions belonging to the processor 116 and the software beamformer may be distributed differently among any number of individual processing components.

According to an embodiment, the ultrasonic imaging system 100 may continuously acquire ultrasound data at a frame rate of, for example, 10 Hz to 30 Hz. An image generated from said data may be refreshed at a similar frame rate. Data may be acquired and displayed at different rates in other embodiments. For example, depending on the size of the volume and potential applications, ultrasound data may be acquired at a frame rate of less than 10 Hz or greater than 30 Hz in some embodiments. For example, many applications relate to acquiring, at a frame rate of 50 Hz, ultrasound data. A memory 120 is included therein to store processing frames for acquiring data. In an exemplary embodiment, the memory 120 has sufficient capacity to store ultrasound data frames that are acquired over a period of time and that are at least a few seconds long. The data frames are stored by using a means which facilitates retrieval according to the order or time of the acquisition thereof. The memory 120 may include any known data storage medium.

Optionally, the embodiments of the present application may be carried out by using a contrast agent. When an ultrasound contrast agent including microbubbles is used, enhanced images of anatomical structures and blood flow in the body are generated by contrast imaging. After acquiring data by using the contrast agent, image analysis includes: separating harmonic components from linear components, enhancing the harmonic components, and generating an ultrasound image by using the enhanced harmonic components. Separation of the harmonic components from the received signal is performed by using an appropriate filter. The use of a contrast agent in ultrasonic imaging is well known to a person skilled in the art, and is therefore not described in further detail.

In various embodiments of the present application, data may be processed by the processor 116 by means of modules of other or different related modes (for example, B-mode, color Doppler, M-mode, color M-mode, spectral Doppler, elastography, TVI, strain, strain rate, and the like) so as to form 2D or 3D images. For example, one or a plurality of modules may generate B-mode, color Doppler, M-mode, color M-mode, spectral Doppler, elastography, TVI, strain, and strain rate, and a combination thereof, etc. Image bundles and/or frames are stored, and timing information indicating the time when data is acquired in the memory may be recorded. The module may include, for example, a scan conversion module that performs scan conversion operations so as to convert image frames from a coordinate bundle space to display space coordinates. A video processor module may be provided that reads image frames from the memory and displays in real time the image frames while performing an operation on a patient. The video processor module may store image frames in an image memory, read images from the image memory, and display the images. The ultrasonic imaging system 100 may be a console-based system, a laptop computer, a handheld or portable system, or any other configuration.

A user interface is typically used for adjustment of a real-time image, such as switching between imaging modes (for example, B-mode, color Doppler, M-mode, color M-mode, spectral Doppler, elastography, TVI, strain, strain rate, and the like), or adjustment of scan parameters (for example, focus, frequency, depth, contrast, gain, amplification, and the like). The above adjustment can be achieved by means of a user interface. Different user interfaces have different functions. For example, the touch screen 151 has different virtual keys, and the different virtual keys represent different functions. Alternatively, the keyboard 152 has different physical functional keys, and the different physical functional keys represent different functions. The user selects a particular user interface according to a required function, and then observes again the ultrasound image on the display device while operating the user interface. The above process increases the workflow of a user, and the process of searching for a user interface prevents the user from continuously observing the ultrasound image as the adjustment is being performed. Furthermore, the arrangement and locations of the above user interfaces are often different for different ultrasonic imaging systems. A user thus needs to develop operating habits for different ultrasound systems.

Figure 2:
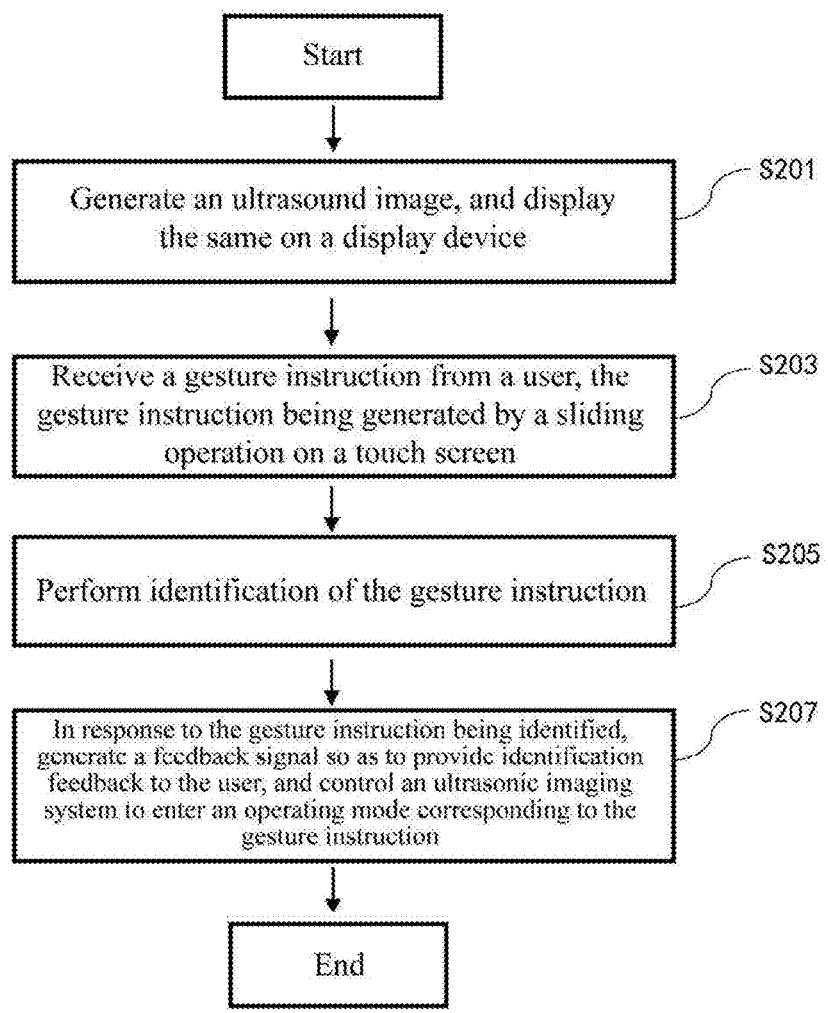
FIG. 2 is a flowchart of an ultrasonic imaging method according to some embodiments of the present application.

At least to solve the above problems, provided in the present application is an ultrasonic imaging method. FIG. 2 is a flowchart of an ultrasonic imaging method 200 according to some embodiments of the present application. Various modules in the flowchart represent steps that can be performed according to the method 200. In additional embodiments, the illustrated steps may be performed in a different order, and/or additional embodiments may include additional steps not shown in FIG. 2.

FIG. 2 is described in further detail below according to an exemplary embodiment. The method may be performed by the ultrasonic imaging system 100 shown in FIG. 1. For example, the method may be performed by the processor 116 in the ultrasonic imaging system 100. Alternatively, the method may be performed by another arbitrary ultrasonic imaging system.

In step S201, an ultrasound image is generated and displayed on a display device. The step may be implemented by the processor 106. For example, the processor 116 may obtain from the probe 106 ultrasound data acquired from a body part of a person to be scanned. Generally, ultrasound signals may be sent by means of the probe 106 to tissue to be imaged, and then ultrasound echo signals from the tissue to be imaged are received by means of the probe 106. The processor 116 can thereby obtain ultrasound data regarding the tissue to be imaged. The tissue to be imaged may be any human/animal tissue or organ. For example, the tissue to be imaged may be a blood vessel, liver, kidney, heart, carotid artery, breast, or the like. Alternatively, the tissue to be imaged may be a lesion, such as a tumor, a carotid artery plaque, or the like. Furthermore, the processor 116 processes the above ultrasound data to generate an ultrasound image. It can be understood that the above ultrasound image may be a two-dimensional ultrasound image, or a color Doppler image, a pulse Doppler image, or any type in the art. The processor 116 further controls the display device to display the generated ultrasound image. The above display process may be performed in real time. That is, synchronous display is performed while the probe 106 performs real-time scanning. In this way, the user can determine, according to an ultrasound image displayed in real time, whether an ultrasonic imaging parameter, an ultrasonic imaging mode, or the like needs to be adjusted.

In step 203, a gesture instruction from a user is received, the gesture instruction being generated by a sliding operation on a touch screen. The step may be implemented by the processor 106. In an embodiment, the processor 106 may record and analyze a capacitance change in the touch screen caused by the sliding operation performed by the user on the touch screen. In this way, a sliding trajectory of a finger on the touch screen 151 can be recorded and analyzed by the processor. The user can generate different types of gesture instructions by means of different sliding operations, and the gesture instructions are received and analyzed by the processor 106. It can be understood that in such a configuration, the user no longer needs to search a user interface, such as on virtual keys of the touch screen 151 or functional keys of the keyboard 152, for a required adjustment key to make an adjustment. The user may closely watch the display device, and can achieve a gesture operation by merely using a hand to slide on the touch screen.

In step 205, identification of the gesture instruction is performed. The step may be implemented by the processor 106. Specifically, the processor performs analysis and comparison on the gesture instruction recorded in step 203. The comparison method may be arbitrary. For example, the processor 106 may search an instruction library prestored in the memory to determine whether the current gesture instruction is stored in the instruction library of the memory. The means for generating the above instruction library may be arbitrary. For example, a corresponding wake-up gesture may be respectively preconfigured for each function among functions (or operating modes) commonly used in ultrasonic imaging, and stored in the memory. It can be understood that each of the above common functions may correspond to a plurality of different wake-up gestures so as to adapt to different habits of users. However, the same wake-up gesture typically only corresponds to one ultrasonic imaging function, thereby preventing the processor 106 from performing wrong allocation during subsequent allocation of ultrasonic imaging operations. In some other embodiments, the instruction library may be specified manually. For example, the user may configure, according to usage habits, types of functions in the instruction library and a wake-up gesture corresponding to each function, so as to allow operating habits of the user to be better accommodated. The search process may include performing similarity matching on a gesture motion trajectory identified by the processor in the above step. If the degree of similarity between a certain wake-up gesture in the instruction library and a gesture instruction received by the processor is greater than a certain specific threshold, then the gesture instruction is successfully identified. Conversely, if the degree of similarity between any wake-up gesture in the instruction library and a gesture instruction received by the processor is not greater than a certain specific threshold, then it is determined that the gesture instruction is not identified.

It can be understood that the above matching threshold may be a machine default. Alternatively, the above matching threshold may be adjusted manually. In addition, the above instruction library may be automatically updated by means of continuous application by users. For example, a gesture acknowledged by a user in a previous use is added to the instruction library as part of the instruction library. Alternatively, a wrong gesture denied by a user in a previous use is not added to the instruction library, or is deleted from the instruction library. In this way, as the number of uses increases, the intelligence and accuracy of the gesture operation identification process of the processor are improved.

In step 207, in response to the gesture instruction being identified, a feedback signal is generated so as to provide identification feedback to the user, and an ultrasonic imaging system is controlled to enter an operating mode corresponding to the gesture instruction. The step may be implemented by the processor 106. Specifically, the gesture instruction identification process may be as described above. For example, when the processor 106 determines that the gesture instruction and a prestored instruction in the instruction library are highly matched, the gesture instruction is determined as being identified. Furthermore, the gesture instruction identification process is well-known in the art and will not be described in additional detail. In addition, when the gesture instruction is identified, the processor 106 may generate a feedback signal so as to provide identification feedback to the user. By means of the identification feedback, the user can obtain intuitive feedback to determine that a gesture has been identified by the ultrasonic imaging system. According to the identification, the processor controls the ultrasonic imaging system to enter a corresponding operating mode. The operating mode may be any adjustable mode in ultrasonic imaging, and may be, for example, switching between imaging modes, adjustment to an ultrasonic imaging parameter, adjustment to an ultrasound image, or the like.

By means of the above configuration, the user can easily and quickly select a required operating mode after observing the ultrasound image. The selection process may be implemented by the user by means of a gesture operation on the touch screen. The user does not need to move their gaze away from the display device, and can therefore pay continuous attention to the ultrasound image on the display device. Furthermore, the user does not need to be overly distracted when determining whether the gesture operation has been successfully identified, and the feedback signal generated by the processor directly provides the identification feedback to the user. In such a process, on the one hand, the user is not distracted by the user interface, and on the other hand, the user does not need to memorize the locations of different user interfaces, such as functional keys, thereby improving operating efficiency.

It can be understood that there can be a variety of methods for configuring the described feedback signal. For example, the feedback signal may be at least one among a vibratory feedback signal, an auditory feedback signal, and a visual feedback signal.

In some embodiments, the above feedback signal may be a vibratory feedback signal. The vibratory feedback signal may be used to control the touch screen 151 to vibrate. In an embodiment, the touch screen 151 may include a vibration device. Specific configuration of the touch screen 151 and the vibration device will be exemplarily described below. The vibration device can be configured to receive a vibratory feedback signal to vibrate the touch screen. In this way, the user can acquire direct tactile feedback while generating a gesture instruction by means of a sliding operation on the touch screen 151, and can sense, without observing the touch screen, that the finger instruction has been identified.

In some embodiments, the above feedback signal may be an auditory feedback signal. The auditory feedback signal can be used to control the ultrasonic imaging system 100 to emit a sound. In an embodiment, the sound of the ultrasonic imaging system 100 may be a special beep. Alternatively, more intuitively, the ultrasonic imaging system 100 may inform, by means of the sound, the user of a currently identified gesture operating mode. In this way, the user can obtain auditory feedback while generating a gesture instruction by means of a sliding operation on the touch screen 115, without the need for observing the touch screen.

In some other embodiments, the above feedback signal may also be a visual feedback signal. Correspondingly, the visual feedback signal can be used to control the ultrasonic imaging system 100 to generate visual feedback. In an embodiment, the visual feedback signal can act on the display device 118. For example, after the gesture operation is identified, the processor 106 may cause the display device 118 to display the identified gesture instruction and/or the operating mode corresponding to the gesture instruction. Since the above visual feedback is performed on the display device 118, the user does not need to look away too much, and only needs to pay a bit of attention to the visual feedback next to the ultrasound image.

In addition, the feedback signal configuration method may also be another method or a combination of any multiple methods, and the details thereof will not be described herein again. Exemplary description of a configuration method of the touch screen 151 providing vibratory feedback is provided below.

Figure 3:
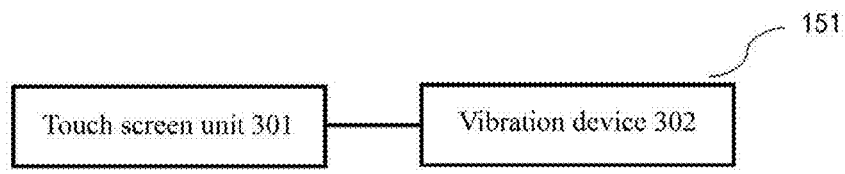
FIG. 3 is a schematic diagram of a touch screen according to some embodiments of the present application.

Referring to FIG. 3, FIG. 3 shows a schematic diagram of the touch screen 151 according to some embodiments of the present application. The touch screen 151 may include a touch screen unit 301 and a vibration device 302.

The touch screen unit 301 may include both a sensing unit configured to sense a touch of a user to generate a corresponding electrical signal and a display unit configured to perform screen display. A configuration method of the touch screen unit 301 may be arbitrary in the art. The sensing unit may include any one among resistive, surface capacitive, and sensing capacitive screens. In a non-limiting embodiment, the touch screen unit 301 is a sensing capacitive touch screen. When a finger is near or touches the touch screen unit 301, a change in capacitance of a corresponding position on the touch screen unit 301 occurs, and is sensed by a circuit, so that a sensing signal is generated. In addition, the display unit of the touch screen unit 301 for display may also be arbitrary in the art. For example, the display unit may be any one among a liquid crystal display screen (LCD display screen), a light-emitting diode display screen (LED display screen), and an organic light-emitting diode display screen (OLED display screen). In addition to the sensing unit and the display unit described above, the touch screen unit 301 may further include a glass cover plate covering the same. The glass cover plate is configured to protect the interior of the touch screen unit 301 from being damaged. The above is merely an exemplary description of the touch screen unit 301. The configuration method of the touch screen unit 301 may also be another method in the art, and details will not be further described herein.

The vibration device 302 may be formed by any one among a linear motor, a rotary motor, and any other electromagnetic vibration device. Upon receiving an electrical signal, the electromagnetic vibration device can move to generate vibration so that the user can sense the same. In addition, the vibration device 302 may also be a piezoelectric material or another structure capable of generating motion in response to an electrical signal, and the details thereof will not be further described herein.

The vibration device 302 and the touch screen unit 301 are directly or indirectly physically connected to one another, so that vibration generated by the vibration device 302 can be transmitted to the touch screen unit 301, and then the user can sense the same. In an example, the vibration device 302 and the touch screen unit 301 are provided side by side, and are physically connected to one another. In another example, the vibration device 302 is configured to be below the touch screen unit 301. In addition, relative positions of the vibration device 302 and the touch screen unit 301 may be arbitrary.

Furthermore, the vibration device 302 is configured to receive a vibratory feedback signal to enable the touch screen 151 to generate vibration. A method for generating the vibratory feedback signal may be any one in the foregoing, and details will not be further described herein. In such a configuration method, the user can acquire direct tactile feedback while operating the touch screen 151, and can sense that a gesture instruction has been identified without observing the touch screen.

In an example, the vibration device 302 is further configured to be adjustable in at least one among vibration intensity, vibration frequency, and vibration duration. The vibration intensity, vibration frequency, and vibration duration can be used to represent different feedback signals to thereby provide different types of feedback information to the user. The vibration intensity and vibration frequency may vary as specific electrical signals inputted to the vibration device 302 vary. An exemplary description is provided below.

Figure 4:
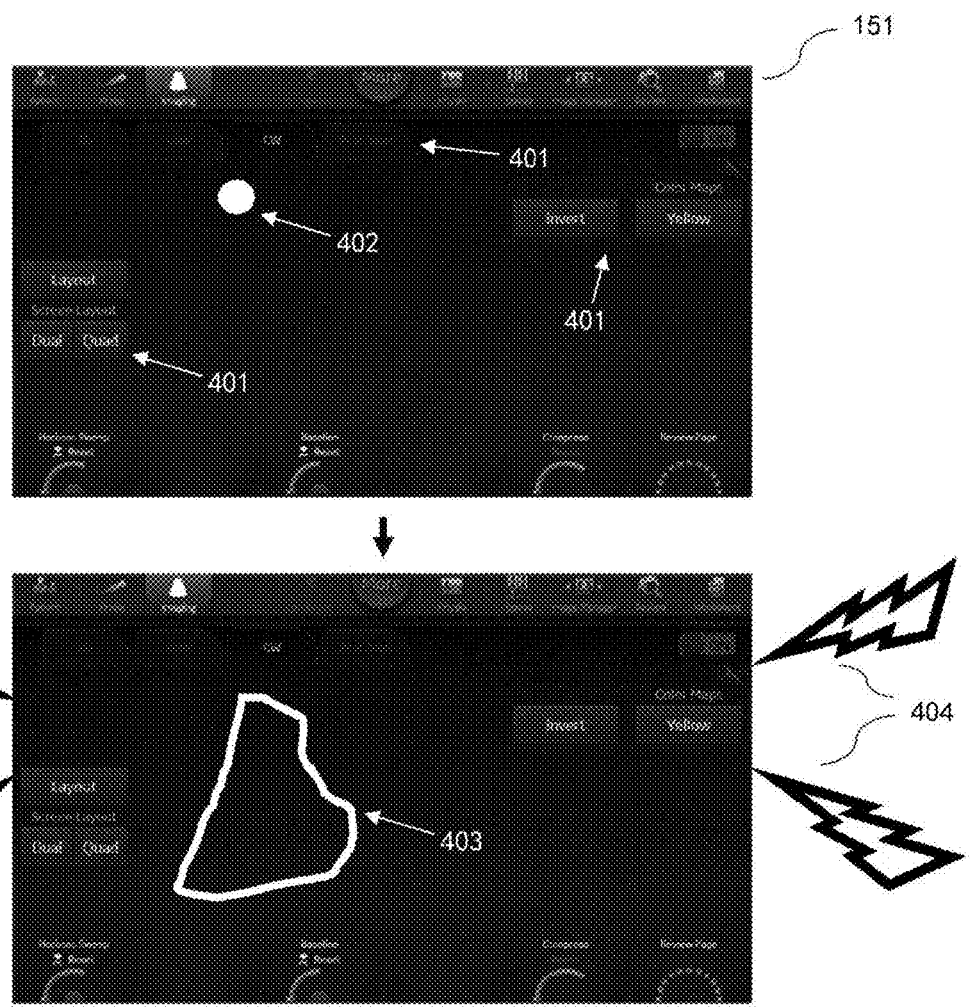
FIG. 4 is a schematic diagram of a gesture instruction on a touch screen not being identified according to some embodiments of the present application.

Referring to FIG. 4, FIG. 4 shows a schematic diagram of a gesture instruction on a touch screen not being identified according to some embodiments of the present application. As shown in FIG. 4, the touch screen 151 includes a plurality of virtual keys 401. Each one among the virtual keys 401 is respectively assigned a different function for a user to select. In a common usage scenario, the user needs to observe the function represented by each virtual key to then select a virtual key to be operated so as to tap or press the same.

In an embodiment of the present application, the user may select a starting touch point 402 on the touch screen 151. The location of the starting touch point 402 may be arbitrary. In an embodiment, the location of the touch point 402 is based on any location in which the user begins touching the touch screen 151. In such a configuration method, the user can arbitrarily perform initial location selection of a gesture operation without observing the touch screen 151.

Furthermore, the user may generate a gesture instruction 403 by performing a sliding operation on the touch screen 151. As shown in FIG. 4, the gesture instruction 403 generates, on the basis of the recorded sliding operation, a trajectory corresponding thereto. Upon receiving the above gesture instruction 403, a processor (not shown) can perform identification of the same. The identification method may be as set forth above, or may be arbitrary in the art. The details thereof will not be further described herein.

In the example illustrated in FIG. 4, in response to the gesture instruction 403 not being identified, the processor generates a feedback signal so as to provide non-identification feedback 404 to the user. In said embodiment, the conclusion of non-identification may be acquired by the processor failing to find, by performing retrieval and matching, an instruction in an instruction library sufficiently similar to the gesture instruction 403, or may be acquired by any other means. Furthermore, the touch screen 151 may generate, according to the feedback signal, the non-identification feedback 404, so that the user can sense the same. The non-identification feedback 404 may be vibratory feedback generated by the vibration device set forth above. As the user is operating the touch screen 151 at said moment, the vibratory non-identification feedback 404 can be easily sensed by the user. It can be understood that the non-identification feedback may also be any type of feedback, such as the auditory feedback or visual feedback described above.

Different users may have different operating habits, for example, different trajectories of the gesture instruction 403. In view of this, further provided in some embodiments of the present application is a policy for updating the gesture instruction 403. Specifically, when it is determined that the gesture instruction 403 is not identified, the user may manually change the gesture instruction 403 into an identifiable gesture instruction, and assign a corresponding operation thereof. In such a configuration method, the degree of accuracy of gesture instruction identification of the present application gradually increases, and causes gesture instruction identification to be better adapted to the usage habits of the user.

Figure 5:
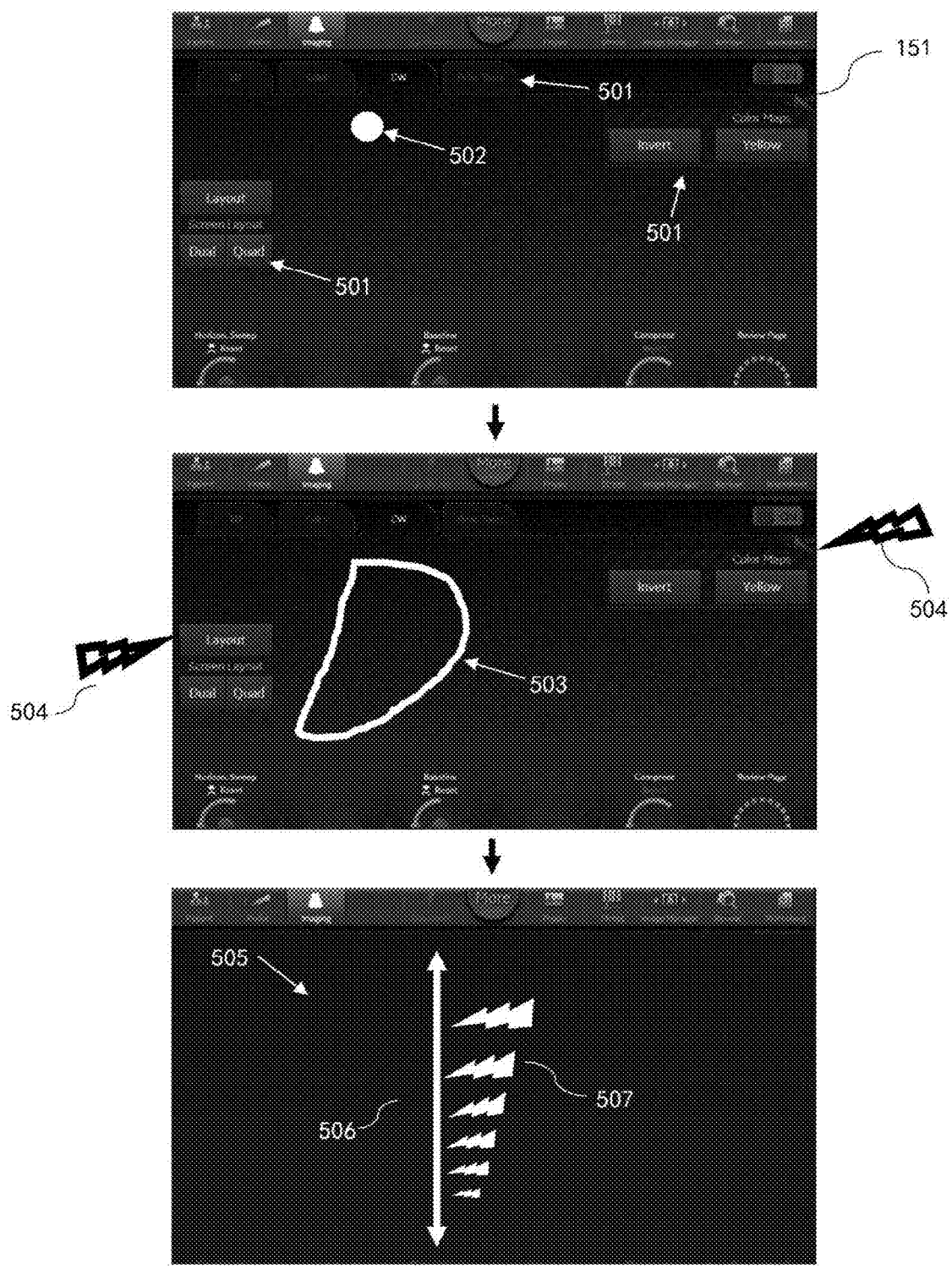
FIG. 5 is a schematic diagram of performing an operation by means of a gesture instruction according to some embodiments of the present application.

When the gesture instruction is identified, the user can enter an operating mode corresponding to the gesture instruction. Exemplary description is provided with reference to FIG. 5. FIG. 5 shows a schematic diagram of performing an operation by means of a gesture instruction according to some embodiments of the present application.

As shown in FIG. 5, the touch screen 151 includes a plurality of virtual keys 501. Similar to the description above, each one among the virtual keys 501 is respectively assigned a different function for a user to select. The user may select a starting touch point 502 on the touch screen 151. The location of the starting touch point 502 may be arbitrary. In an embodiment, the location of the touch point 502 is based on any location in which the user begins touching the touch screen 151.

The user may generate a gesture instruction 503 by performing a sliding operation on the touch screen 151. As shown in FIG. 5, the gesture instruction 503 generates, on the basis of the recorded sliding operation, a trajectory corresponding thereto. Upon receiving the above gesture instruction 503, a processor (not shown) can perform identification of the same. The identification method may be as set forth above, or may be arbitrary in the art. The details thereof will not be further described herein. In addition, in response to the gesture instruction 503 being identified, the processor generates a feedback signal so as to provide identification feedback 504 to the user. In some embodiments, the touch screen 151 may generate, according to the feedback signal, the identification feedback 504 in the form of vibration, so that the user can sense the same.

It can be understood that the identification feedback 504 is different from the non-identification feedback 404. In this way, the user can sense, by means of tactility for example, whether the gesture instruction has been identified, without observing the touch screen 151. The methods for distinguishing between the identification feedback 504 and the non-identification feedback 404 can be varied. When the identification feedback is configured to be vibratory feedback, the above distinguishing method may consist in a difference in at least one among vibration frequency, vibration intensity, and vibration duration. When the identification feedback is configured to be auditory feedback, the above distinguishing method may be the result of directly informing the user of the identification feedback by means of voice broadcasting. When the identification feedback is configured to be visual feedback, the above distinguishing method may be directly displaying an identification result on the display device, so that the user can learn the same. Details will not be further described herein.

With continued reference to FIG. 5, after the gesture instruction 503 is identified, the ultrasonic imaging system may further be controlled to enter an operating mode 505 corresponding to the gesture instruction 503. In the operating mode 505, the user may operate the ultrasonic imaging system by means of an operating instruction 506. The processor may receive the operating instruction 506 from the user, and adjust an ultrasound image (not shown). In a non-limiting embodiment, the user slides on the touch screen 151 to generate a shape similar to the letter "D". The processor identifies that the operating mode 505 represented by the letter "D" is a depth adjustment mode. The touch screen 151 generates vibratory feedback so that the user can sense the same. In addition, the processor controls the ultrasonic imaging system to enter the depth adjustment mode. At which time, the user may continue to operate the touch screen 151 to perform image depth adjustment.

A configuration method of the operating instruction 506 may be arbitrary. For example, the user may perform a sliding operation on the touch screen 151 to achieve the configuration. In a non-limiting embodiment, the operating instruction 506 may include sliding in an up-down direction of the touch screen 151. For example, in the depth adjustment mode described above, the depth is increased by sliding upwards. Conversely, the depth is decreased by sliding downwards. It can be understood that the operating mode may also be any other modes, and will not be described in additional detail.

Furthermore, while the ultrasound image is being adjusted, a feedback signal may be further generated so as to provide adjustment feedback to the user. Referring to FIG. 5, upon receiving the operating instruction 506 of the user, the processor may generate a feedback signal and send the same to the touch screen 151. The touch screen 151 may provide adjustment feedback 507 to the user. In an embodiment, the adjustment feedback 507 may be vibratory feedback. For example, the adjustment feedback may be dynamically changed according to a parameter of a current ultrasound image subjected to the operation of the operating instruction 506 of the user. In the depth adjustment mode, the user slides upwards, and the depth is increased. Correspondingly, the adjustment feedback 507 may provide a feedback experience in which vibration gradually increases. Similarly, the user slides downwards, and the depth is decreased. Correspondingly, the adjustment feedback 507 may provide a feedback experience in which vibration gradually decreases. Without observing the touch screen, the user can intuitively sense, by means of the adjustment feedback 507, a change in ultrasound image adjustment caused by the operating instruction 506.

It should be noted that a configuration method of the above gesture instruction 503 may be arbitrary. For example, the gesture "G" represents gain adjustment, and/or the gesture "Z" represents zooming in. Multiple of the above gesture instructions 503 may coexist, and the gesture instruction 503 may be customized by the user according to personal usage habits. In an example, identification of the gesture instruction 503 may allow for a delay that is preset for a certain period of time, for example 2-3 seconds or any other time. In such a configuration, when the user needs to slide on the touch screen multiple times to complete a certain complete gesture instruction, the processor does not determine that the described multiple operations are different gesture instructions, thereby greatly reducing the risk of a maloperation.

It is recognized that the touch screen 151 has virtual keys, and a maloperation may occur when the user performs an operation, thereby affecting the degree of accuracy. Improvement is provided in some embodiments of the present application. Specifically, in an operating mode corresponding to the gesture instruction, functions of the virtual keys on the touch screen are disabled. With continued reference to FIG. 5, in the operating mode 505 corresponding to the gesture instruction 503, the virtual keys 501, originally displayed on the touch screen 151, are configured to disappear from the touch screen 151. In such a configuration, the majority or even all of the area of the touch screen 151 can be operated by the user to generate the operating instruction 506. In this way, a maloperation caused by the user concentrating on observing an ultrasound image on the display device is prevented. In addition, it can be understood that a disabling method may also be any other method. For example, the original virtual keys 501 may be retained, and even if the user touches an original virtual key 501, the function corresponding thereto will not be triggered, until the user exits the operating mode corresponding to the gesture instruction.

Figure 6:
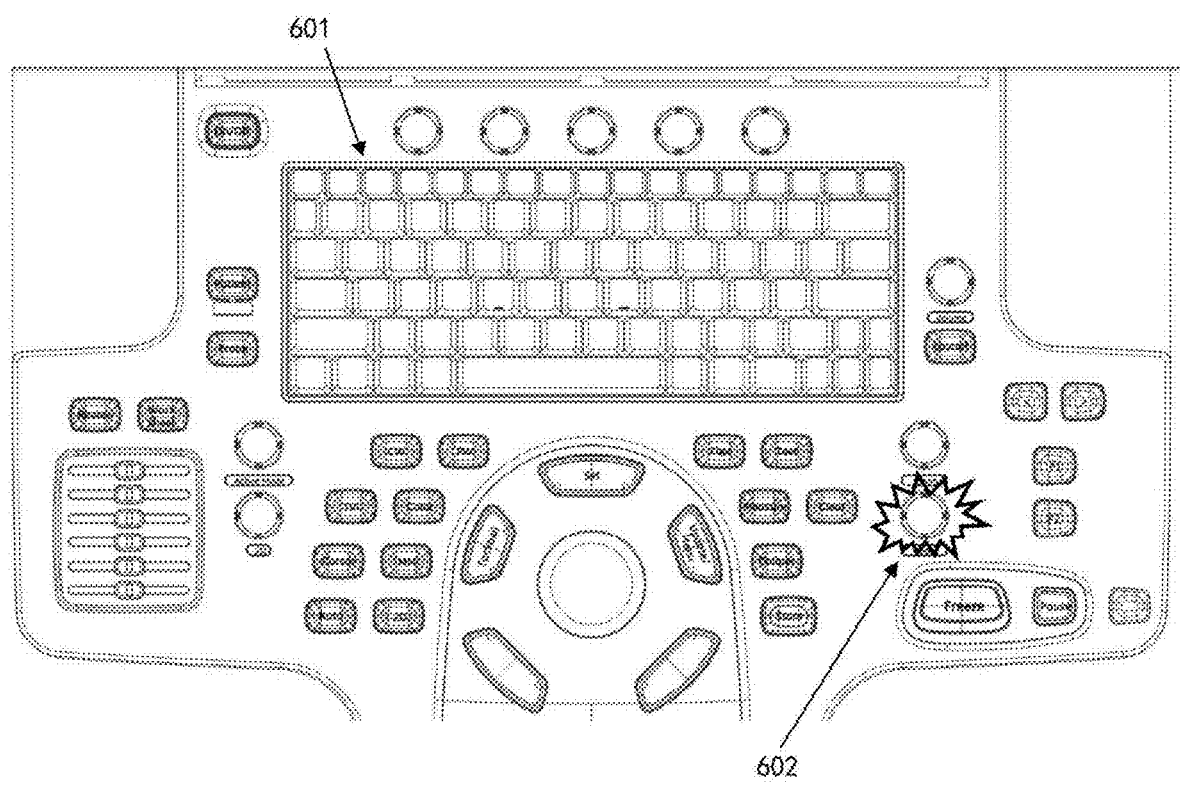
FIG. 6 is a schematic diagram of highlighting a functional key of a keyboard according to some embodiments of the present application.

As set forth above in the present application, user interface configuration methods may be different in different ultrasonic imaging systems. The same user operating different ultrasonic apparatuses needs to develop different user habits. In view of this, in some embodiments of the present application, further provided is a method for facilitating user familiarity with a user interface. Specifically, a functional key corresponding to the gesture instruction may be determined, and the functional key may be highlighted. A detailed description is provided with reference to FIG. 5 and FIG. 6. FIG. 6 shows a schematic diagram of highlighting a functional key 602 of the keyboard 152 according to some embodiments of the present application.

As shown in FIG. 6, the keyboard 152 may include physical keys 601 of different types. The different physical keys 601 have different functions. These functions may be assigned by an ultrasonic imaging system by default, or may be customized and configured by a user according to personal habits. Said physical keys 601 may be used for a variety of operations such as information input, switching between imaging modes, and adjustment to an imaging parameter, the details of which will not be further described herein. In a conventional operating process, a user searches the keyboard 152 for a required physical key to perform a corresponding operation. For example, the functional key 602 is found, so that an imaging parameter, such as the depth, can be adjusted. The user can rotate the functional key 602 to increase the imaging depth, and can also rotate in the reverse direction to decrease the imaging depth. The locations and/or adjustment methods of the functional key may be different for different ultrasonic imaging systems.

In some embodiments of the present application, for example, in an embodiment similar to that in FIG. 5, the user may perform a gesture operation to slide on the touch screen 151 to generate a shape similar to the letter "D". The operating mode 505 represented by the letter "D" is a depth adjustment mode. Thus, the ultrasonic imaging system directly enters the depth adjustment mode, and the user does not need to search for the specific location of the functional key 602. Furthermore, the functional key corresponding to the gesture instruction is determined and highlighted. The effect of highlighting may be achieved by means of a backlight of the keyboard, as shown in FIG. 6. In an embodiment, the determined functional key 602 has a more intense backlight so as to be easily observed by the user. In another embodiment, the determined functional key 602 has a backlight that is different from that of other physical keys so as to be highlighted. In addition, the determined functional key 602 may also be highlighted in other manners, for example, by means of a flickering backlight so as to be easily observed.

In such a configuration, the operating mode in which the user enters by means of a gesture operation is mapped to a physical key. In particular, for a novice user, quick familiarization with the key layout of an ultrasonic imaging system by means of such a method is facilitated, and can help the user to develop operating habits.

It should be noted that the functional key 602 in FIG. 6 is described as a physical key. In some other embodiments of the present application, the functional key 602 may also be one among the virtual keys on the touch screen 151. The highlighting method may be as described above in the present application, and may also be any other type.

The configuration method in any above embodiment of the present application allows a user to easily and quickly select a required operating mode after observing an ultrasound image. The selection process may be implemented by the user by means of a gesture operation on the touch screen. The user does not need to move their gaze away from the display device, and can therefore pay continuous attention to an ultrasound image on the display device. Furthermore, the user does not need to be overly distracted when determining whether the gesture operation has been successfully identified, and the feedback signal generated by the processor directly provides the identification feedback to the user. In such a configuration, on the one hand, the user is not distracted by the user interface, and on the other hand, the user does not need to memorize the locations of different user interfaces, such as functional keys, thereby improving operating efficiency.

It can be understood that if it is not explicitly indicated otherwise, the steps of any embodiments of the present application can be adjusted or combined arbitrarily.

Some embodiments of the present application further provide an ultrasonic imaging system, which may be as shown in FIG. 1 or any other ultrasonic imaging system. The system includes: a probe, which is configured to acquire a signal for generating an ultrasound image; a touch screen, which is configured for operation to generate an instruction; a processor, which is configured to perform the method according to any one of the above embodiments; and a display device, which is configured to receive a signal from the processor for display.

Some embodiments of the present application further provide a non-transitory computer-readable medium having a computer program stored therein, the computer program having at least one code segment, and the at least one code segment being executable by a machine so as to enable the machine to perform the steps of the method in any of the embodiments described above.

Correspondingly, the present disclosure may be implemented as hardware, software, or a combination of hardware and software. The present disclosure may be implemented in at least one computer system by using a centralized means or in a distributed means, different elements in the distributed means being distributed on a number of interconnected computer systems. Any type of computer system or other device suitable for implementing the methods described herein is considered to be appropriate.

The various embodiments may also be embedded in a computer program product, which includes all features capable of implementing the methods described herein, and the computer program product is capable of executing these methods when loaded into a computer system. The computer program in the present context means any expression in any language, code, or symbol of an instruction set intended to enable a system having information processing capabilities to execute a specific function directly or after any one or two among: a) conversion into another language, code, or symbol; and b) duplication as a different material.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An ultrasonic imaging method, comprising:
generating an ultrasound image and displaying the ultrasound image on a display device;
receiving a gesture instruction from a user, the gesture instruction being generated by a sliding operation on a touch screen;
performing identification of the gesture instruction; and
in response to the gesture instruction being identified:
generating a feedback signal to provide identification feedback of the gesture instruction to the user;
controlling an ultrasonic imaging system to enter an operating mode corresponding to the gesture instruction;
receiving an operating instruction from the user while in the operating mode, the operating instruction corresponding to an additional gesture instruction input generated by an additional sliding operation on the touch screen;
adjusting the ultrasound image in response to the additional gesture instruction; and
generating an additional feedback signal to provide adjustment feedback to the user while adjusting the ultrasound image.

2. The method according to claim 1, wherein
the feedback signal comprises one or more of a vibratory feedback signal, an auditory feedback signal, or a visual feedback signal.

3. The method according to claim 2, wherein
the feedback signal comprises the vibratory feedback signal, and the touch screen receives the vibratory feedback signal to generate vibration.

4. The method according to claim 2, wherein the feedback signal comprises the visual feedback signal, and the display device receives the visual feedback signal to display visual feedback.

5. The method according to claim 2, wherein the feedback signal comprises the auditory feedback signal.

6. The method according to claim 1, wherein in the operating mode corresponding to the gesture instruction, a function of a virtual key on the touch screen is disabled.

7. The method according to claim 1, further comprising:
determining a functional key corresponding to the gesture instruction, and highlighting the functional key.

8. An ultrasonic imaging system, comprising:
a probe;
a touch screen;
a display device; and
a processor configured to:
control the probe to acquire ultrasound data;
generate an ultrasound image based on the ultrasound data;
display the ultrasound image on the display device;
receive a gesture instruction that is generated by a sliding operation input through the touch screen;
perform identification of the gesture instruction;
generate a feedback signal to provide identification feedback of the gesture instruction; and
control the ultrasonic imaging system to enter an operating mode corresponding to the gesture instruction,
wherein the feedback signal comprises one or more of a vibratory feedback signal, an auditory feedback signal, or a visual feedback signal,
wherein, based on the feedback signal comprising the vibratory feedback signal, the touch screen is configured to receive the vibratory feedback signal to generate vibration, and
wherein, based on the feedback signal comprising the auditory feedback signal, and the processor is configured to control the ultrasonic imaging system to emit a sound in response to the auditory feedback signal.

9. The ultrasonic imaging system of claim 8, wherein the processor is further configured to:
receive an additional operating instruction generated by an additional sliding operation input through the touch screen while in the operating mode; and
adjust the ultrasound image in response to the additional operating instruction.

10. The ultrasonic imaging system of claim 9, wherein the processor is further configured to generate an additional feedback signal to provide adjustment feedback while adjusting the ultrasound image.

11. The ultrasonic imaging system of claim 9, wherein the feedback signal comprises the visual feedback signal, and the display device is configured to receive the visual feedback signal and display visual feedback.

12. An ultrasonic imaging system, comprising:
a probe;
a touch screen;
a display device; and
a processor configured to:
  control the probe to acquire ultrasound data;
  generate an ultrasound image based on the ultrasound data;
  display the ultrasound image on the display device;
  receive a gesture instruction that is generated by a sliding operation input through the touch screen;
  perform identification of the gesture instruction;
  generate a feedback signal to provide identification feedback of the gesture instruction; and
control the ultrasonic imaging system to enter an operating mode corresponding to the gesture instruction,
receive an additional operating instruction generated by an additional sliding operation input through the touch screen while in the operating mode;
adjust the ultrasound image in response to the additional operating instruction; and
disable a function of a virtual key on the touch screen while in the operating mode corresponding to the gesture instruction.

13. An ultrasonic imaging system, comprising:
a probe;
a touch screen;
a display device; and
a processor configured to:
  control the probe to acquire ultrasound data;
  generate an ultrasound image based on the ultrasound data;
  display the ultrasound image on the display device;
  receive a gesture instruction that is generated by a sliding operation input through the touch screen;
  perform identification of the gesture instruction;
  generate a feedback signal to provide identification feedback of the gesture instruction;
  control the ultrasonic imaging system to enter an operating mode corresponding to the gesture instruction; and
  determine a functional key corresponding to the gesture instruction and highlight the functional key.

* * * * *